No. 837,314.
PATENTED DEC. 4, 1906.
J. G. LINTON.
PLUMB LEVEL.
APPLICATION FILED APR. 10, 1906.
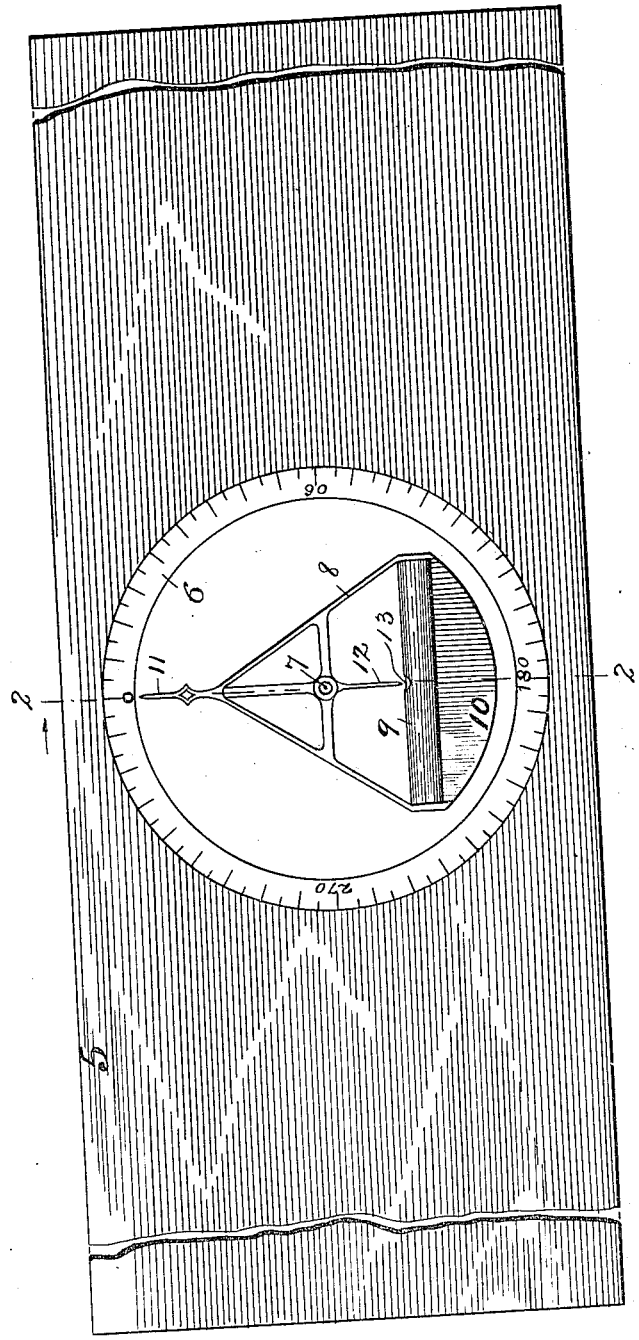
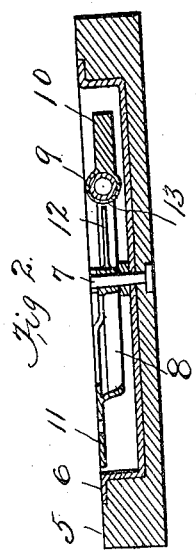
Witnesses
W. Res. Edelen.
Frank G. Campbell.
Inventor
John G. Linton
By Shepherd & Parker
Attorneys

UNITED STATES PATENT OFFICE.

JOHN G. LINTON, OF TRINITY CENTER, CALIFORNIA.

PLUMB-LEVEL.

No. 837,314.

Specification of Letters Patent.

Patented Dec. 4, 1906.

Application filed April 10, 1906. Serial No. 311,008.

*To all whom it may concern:*

Be it known that I, JOHN G. LINTON, a citizen of the United States, residing at Trinity Center, in the county of Trinity and State of California, have invented certain new and useful Improvements in Plumb-Levels, of which the following is a specification.

This invention relates to a combined plumb-bob and spirit-level, and has for its object the provision of a device of this character adapted to accurately indicate when the surface upon which the device is placed is perfectly level and also to indicate to a degree the angle of the plane of said surface with relation to a perfectly-level plane.

Further objects and advantages of the invention will be set forth in the detailed description which now follows.

The accompanying drawings illustrate a front elevation of a plumb-bob and spirit-level constructed in accordance with the invention.

Figure 1 is a front elevation of a device constructed in accordance with my invention, and Fig. 2 is a vertical transverse section thereof on the line 2 2 of Fig. 1.

Referring to the drawings, the numeral 5 designates an elongated block. Secured to the face of this block is a circular scale 6, which may be graduated in any desired manner, though the indications are preferably degrees of a circle. Pivoted concentrically within this scale, as at 7, is an A-shaped frame 8, the lower end of which is spanned by a spirit-level 9 and is weighted, as at 10. An indicating-point 11, carried upon the upper end of the A-shaped frame, coacts with the graduations of the scale to indicate the degree of elevation of the surface to which the device is applied. The weight 10 serves to influence the indicating-point to promptly respond to any movement of block 5.

If desired, the indicating-point 12 adjacent the side opening 13 of the spirit-level may be employed to aid in determining when the bubble is exactly in the middle of the level 9.

From the foregoing description it will be seen that simple and efficient means are herein provided for accomplishing the objects of the invention; but while the elements shown and described are well adapted to serve the purpose for which they are intended it is to be understood that my invention is not limited to the precise construction set forth, but includes within its purview such changes as may be made within the scope of the appended claim.

Having described my invention, what I claim is—

A device of the type set forth comprising a supporting-block formed with a circular recess, an annular scale secured to said block and exteriorly concentric to the wall of said recess, a rocking frame centrally pivoted within said recess, said frame being of substantial A shape and being formed with a central cross-bar, integral legs projecting on each side of said cross-bar and converging to an apex at their upper ends, a weight spanning the lower ends of said legs, and a double-ended perpendicular pointer intersecting said cross-bar at a central point said frame being pivoted at the junction of said cross-bar and said pointer and a horizontal spirit-level spanning the lower ends of said legs above said weight, said pointer having its upper end projected toward said scale and its lower end projected toward said level at a central point.

In testimony whereof I affix my signature in presence of two witnesses.

JOHN G. LINTON.

Witnesses:
T. F. BERGIN,
R. C. CARTER.